Dec. 25, 1962  W. B. HARVEY  3,069,922
SPROCKET WITH REPLACEABLE TEETH
Filed July 10, 1961  2 Sheets-Sheet 1

INVENTOR.
Walter B. Harvey
BY Wells & St John
Attys.

Dec. 25, 1962 W. B. HARVEY 3,069,922
SPROCKET WITH REPLACEABLE TEETH
Filed July 10, 1961 2 Sheets-Sheet 2

INVENTOR.
Walter B. Harvey
BY *Walls & St.John*
Attys.

United States Patent Office 3,069,922
Patented Dec. 25, 1962

3,069,922
SPROCKET WITH REPLACEABLE TEETH
Walter B. Harvey, P.O. Box 144, Santa, Idaho
Filed July 10, 1961, Ser. No. 123,405
1 Claim. (Cl. 74—243)

This invention relates to a novel sprocket constructed with replaceable sprocket teeth.

The invention described below pertains to sprockets such as those utilized to support roller chains and those used to support conveyor chains. Most sprockets today are constructed as an integral unit and must be replaced, should one tooth be broken or damaged during use. Such replacement involves material costs and also involves expensive shut down of the machinery during repair, since the entire sprocket must be removed from the supporting shaft on which it is mounted. The present invention is designed to eliminate such costly shut downs and to lessen the replacement costs due to broken sprocket teeth. This is accomplished by providing a permanent central hub and a projecting plate on which are mounted replaceable sprocket teeth. It is the novel mounting of these teeth which constitute the basic concept of the invention.

It is a first object of this invention to provide a sprocket having removably mounted teeth about the periphery thereof. The teeth are to be easily mounted in place without the necessity of disturbing the mounting arrangement of adjacent teeth.

It is another object of this invention to provide a sprocket with removable teeth wherein the teeth are accurately placed on the basic sprocket surface by the very mounting procedure which attaches them thereto.

It is a final object of this invention to provide a sprocket with removable teeth so as to lessen the replacement cost of broken teeth, to lessen inventory requirements and to lessen work stoppage for replacement purposes.

These objects and others will be evident from a study of the following disclosure and the accompanying drawings which illustrate one preferred form of the invention. This form is exemplary and is not designed to limit or restrict the extent of the invention which is fully defined in the claim annexed to the description.

Figure 1:
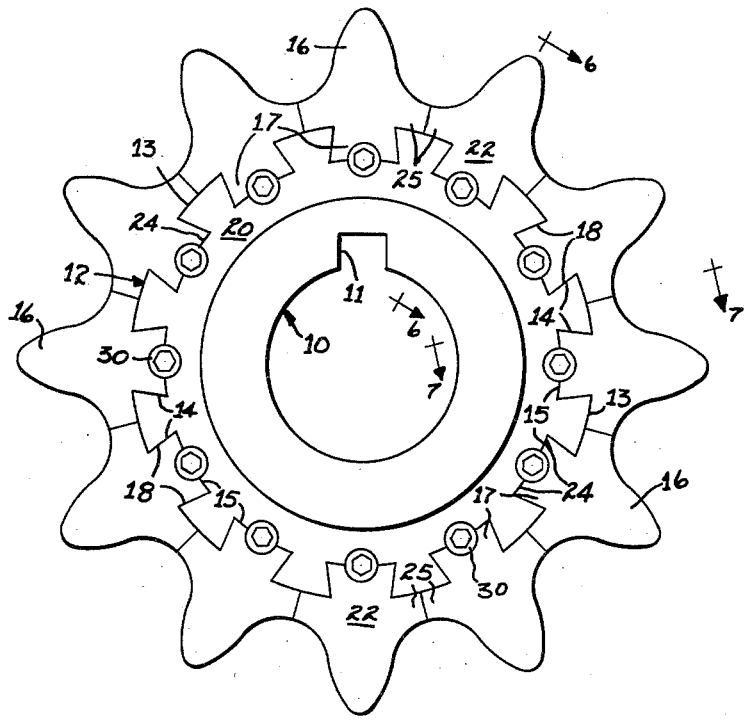
FIGURE 1 is an elevation view of a complete sprocket assembly constructed according to the present invention.
Figure 2:
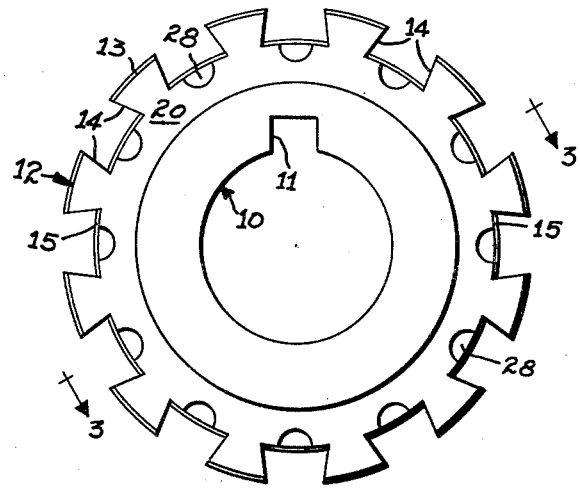
FIGURE 2 is an elevation view of the central mounting plate without teeth mounted thereon.

The present invention relates to a sprocket assembly for driving roller or conveyor chains. It is adapted to replace unitary sprockets which require complete removal, should breakage occur on any one of the sprocket teeth about its periphery. The sprocket includes a central cylindrical hub 10 which is keyed at 11 so as to be mounted on a supporting shaft (not shown). The hub structure 10 is identical to that commonly used in sprocket assemblies having unitary construction. Extended radially from the cylindrical hub 10 is a plate 12. The plate 12 has plane sides 20 and 21. It is bounded by a circular surface 13 which defines the periphery of plate 12. The surface 13 is slightly tapered from the side 20 to the side 21, as can best be seen in FIGURES 3 and 7. The axial radius along the surface of the side 21 to the intersection of that side and the circular surface 13 should be slightly greater than the corresponding axial measurement along plane side 20. The taper utilized is exaggerated in the accompanying drawings for purposes of illustration. The actual taper should not exceed more than a few thousandths of an inch across the width of plate 12.

Cut along the outer periphery of plate 12 through the circular surface 13 are a plurality of equiangularly spaced recesses having diverging sides 14. The sides 14 terminate along an arcuate surface 15 cut concentrically with the previously described surface 13. The surface 15 is also tapered between the sides 20 and 21 in a degree identical to that taper used on surface 13. This relationship may be seen best in FIGURE 3.

Figure 4:
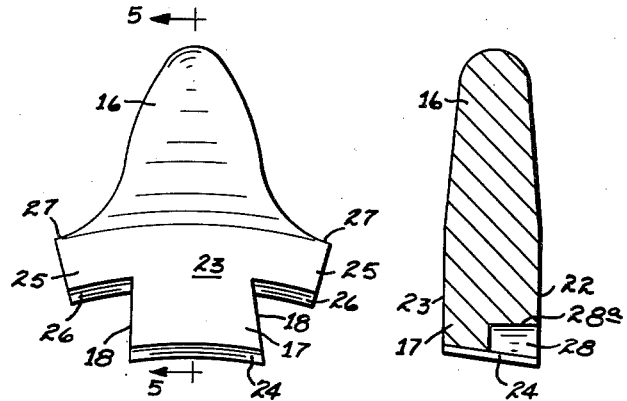
FIGURE 4 is an enlarged elevation view of a single sprocket tooth removed from the sprocket assembly.
Figure 5:
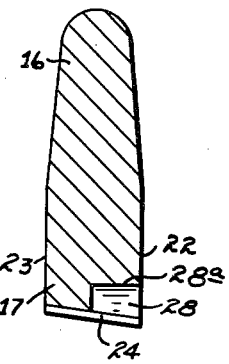
FIGURE 5 is a sectional view taken along line 5—5 in FIGURE 4.

Adopted to be inserted along the periphery of plate 12 are a plurality of sprocket teeth, each including a conventional sprocket tooth portion 16 and a supporting base, having a protruding key 17. The sprocket tooth portion 16 will not be further described since the configuration of such teeth vary with each type of installation and since the precise configuration of this portion is unimportant to the present description. The number of sprocket teeth will be identical to the number of recesses cut along the surface 15 on plate 12. The width of the tooth base which is shown in detail in FIGURES 4 and 5, measured between the plane sides 22 and 23 is identical to the width of plate 12, measured between its plane surfaces 20 and 21. The protruding key 17 of each base is formed with diverging sides 18 which are complementary to the sides 14 in the recesses cut through plate 12. The sides 18 terminate at their inner ends along an arcuate concave surface 24 which is tapered to exactly complement the surface 15 at the base of the recesses cut through radial plate 12. At their outer ends the sides 18 are terminated along shoulders 25 which extend circumferentially outward to the roots of the respective sprocket tooth portion 16 at either side thereof. Shoulders 25 are provided with an arcuate surface 26 which exactly complements the contour of the circular surface 13 on plate 12. The shoulders 25 terminate in radial edges 27 which intersect the roots of the sprocket tooth portion 16.

Figure 6:
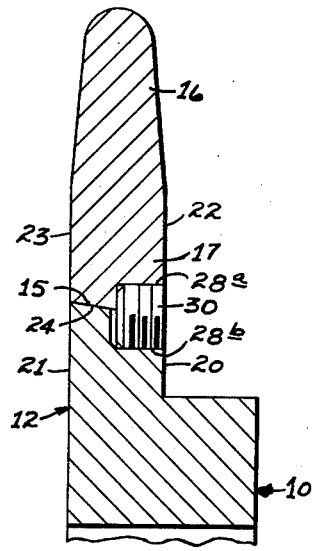
FIGURE 6 is a sectional view taken along line 6—6 in FIGURE 1.
Figure 7:
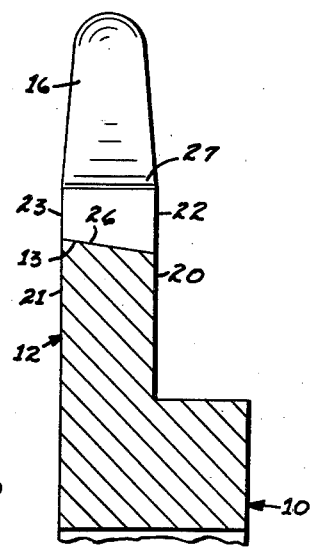
FIGURE 7 is a sectional view taken along line 7—7 in FIGURE 1.

It should be evident from the above description and the drawings that the replaceable teeth fit on the plate 12 with the protruding key 17 of each tooth being interlocked within the recesses cut through the circular surface 13 of plate 12. The teeth must be slipped onto the radial plate 12 in an axial direction from the right hand side illustrated in FIGURE 7. As the teeth are individually mounted on the plate 12 the surfaces 13 and 15 on plate 12, will mate with the corresponding surfaces 26 and 24 of each key 17. Thus the sides 20 and 22 as well as the sides 21 and 23, will be aligned in common planes as illustrated in FIGURES 6 and 7. The tapers are utilized to fix the axial position of the teeth on plate 12. The diverging sides 14 and 18 are utilized to prevent radial movement of the individual teeth relative to plate 12. Thus the only direction in which the teeth could possibly move would be to the right, as seen in FIGURE 7.

Figure 3:
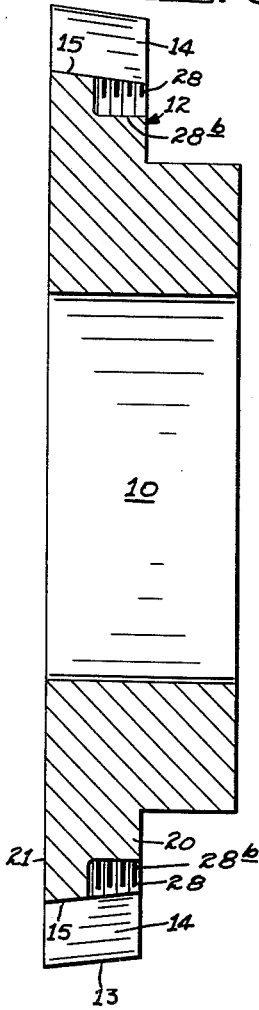
FIGURE 3 is a sectional view along line 3—3 of FIGURE 2, taken at an enlarged scale.

In order to lock the individual teeth on the plate 12, apertures 28 are cut through both the key 17 and the plate 12 along their boundary surfaces 24—15 respectively. Apertures 28 are cylindrical and extend only partially through the thickness bounded by the sides 20—21 of plate 12, and sides 22—23 of each key 17. The apertures 28 are preferably located at the center of each removable tooth directly in radial alignment with the teeth of each individual tooth portion 16. The portion 28a of each aperture 28, which is cut through the key 17, is left in a smooth condition. The portion 28b cut through plate 12, as seen in FIGURE 3, is preferably threaded with internal threads. A recessed screw 30 is threadably engaged with the threaded portion 28b of aperture 28 and abuts the end of the portion 28a of aperture 28 to thereby limit axial movement of each tooth in the direction of the surface tapers. This assembly should be evident from a study of FIGURE 6. Thus the teeth are mounted on plate 12 in a position fixed against movement in any direction.

The interchangeability of the teeth on plate 12 should be evident from this disclosure. To remove any tooth, it is necessary only to first remove the screw 30, then to slip the tooth axially relative to the plate 12 in a direction allowed by the respective tapered surfaces. Thus a broken tooth may be removed without damaging or disturbing adjacent teeth. This construction also allows one to utilize hardened steel for the construction of the teeth while permitting the use of a lower grade of steel for the construction of the integral hub 10 and plate 12. Complete removal of the hub 10 should not be necessary under normal useage since the hub 10 and plate 12 will seldom be damaged. The strength of the overall unit is entirely sufficient to meet normal specifications and is not detrimental in any regard. The savings in inventory and in replacement costs are considerable.

The teeth constructed according to the present invention may be utilized on plates of varying diameter with a sufficient tolerance to meet normal specifications. The teeth obviously must be of the same pitch but for a given pitch a single tooth structure can be utilized for sprockets having a wide range of tooth numbers. For instance, a tooth constructed for use on a sprocket for a No. 100 roller chain having 12 teeth, may also be used on similar sprockets for the same chain having teeth in any number up to 30 teeth. Beyond that number of teeth the arc configurations must be modified to accommodate the increased diameters. This interchangeability between sprockets of different teeth numbers allows a user to stock a comparative small number of teeth to service a wide variety of sprocket applications.

Various modifications may well be evident to one studying this description without deviating from my basic invention. It is for this reason that the following claim is intended as the only definitions of the scope of the invention.

Having thus described my invention I claim:
A sprocket assembly comprising:
a hub adapted to be mounted on a shaft for rotation about the central shaft axis;
a radial plate fixed to said hub and bounded by a circular peripheral surface having a taper from one side of said plate to the remaining side thereof;
a plurality of equiangularly spaced recesses formed inwardly from said peripheral surface and extending across the full width thereof, said recesses including spaced side walls diverging inwardly from said peripheral surface and terminating along a surface tapered from said one side of the plate to said remaining side identically to the taper of said peripheral surface;
a plurality of replaceable teeth located about the periphery of said plate, each including a radially extended sprocket tooth portion and an integrally formed base portion, said base portion having a key centered radially inward of the tooth peak and including outwardly directed exterior walls terminating at their bases along a tapered surface, said exterior walls and said tapered surface being adapted to complement said side walls and said tapered surface of an individual plate recess respectively, said base further comprising arcuate shoulders extending outwardly from said exterior walls at their ends opposite said tapered surface, said shoulders including arcuate side surfaces adapted to complement the curvature and taper of the plate peripheral surface and terminating in radially directed surfaces intersecting the roots of each sprocket tooth portion, said teeth being interlocked with said plate, the key of each tooth being secured by a single plate recess;
and locking means connecting each tooth and said plate adapted to individually prevent motion of said teeth relative to said plate in a direction parallel to the shaft axis.

References Cited in the file of this patent

UNITED STATES PATENTS

| | | |
|---|---|---|
| 1,648,550 | Kantor | Nov. 8, 1927 |
| 2,446,846 | Noble | Aug. 10, 1948 |

FOREIGN PATENTS

| | | |
|---|---|---|
| 28,232 | Great Britain | of 1896 |